(12) United States Patent
Knoll et al.

(10) Patent No.: US 11,022,513 B2
(45) Date of Patent: Jun. 1, 2021

(54) PRESSURE MEASURING DEVICE

(71) Applicant: IFM ELECTRONIC GMBH, Essen (DE)

(72) Inventors: Guido Knoll, Wangen (DE); Hans-Peter Müller, Blitzenreute (DE); Lorenz Halbinger, Kisslegg (DE)

(73) Assignee: IFM ELECTRONIC GMBH, Essen (DE)

( * ) Notice: Subject to any disclaimer, the term of this patent is extended or adjusted under 35 U.S.C. 154(b) by 210 days.

(21) Appl. No.: 16/085,207

(22) PCT Filed: Mar. 13, 2017

(86) PCT No.: PCT/EP2017/055760
§ 371 (c)(1),
(2) Date: Sep. 14, 2018

(87) PCT Pub. No.: WO2017/157811
PCT Pub. Date: Sep. 21, 2017

(65) Prior Publication Data
US 2019/0078956 A1  Mar. 14, 2019

(30) Foreign Application Priority Data
Mar. 18, 2016 (DE) ...................... 10 2016 204 511.3

(51) Int. Cl.
*G01L 19/14* (2006.01)
*G01L 9/12* (2006.01)
*G01L 9/00* (2006.01)

(52) U.S. Cl.
CPC .......... *G01L 19/146* (2013.01); *G01L 9/0075* (2013.01); *G01L 9/12* (2013.01);
(Continued)

(58) Field of Classification Search
CPC ..... G01L 19/146; G01L 19/14; G01L 19/147; G01L 9/0075; G01L 9/12
(Continued)

(56) References Cited

U.S. PATENT DOCUMENTS 5,174,157 A    12/1992  Obermeier et al.
5,824,909 A *  10/1998  Kathan ................ G01L 9/0075
                                                       73/706
(Continued)

FOREIGN PATENT DOCUMENTS

DE         4018638 A1    12/1991
DE        19628551 A1     2/1997
(Continued)

*Primary Examiner* — Tarun Sinha
(74) *Attorney, Agent, or Firm* — Harness, Dickey & Pierce, P.L.C.

(57) ABSTRACT

A pressure measuring device comprises a capacitive pressure measuring cell, a process connector including a retaining element, a housing mounted on the process connector, and a sealing element arranged between an inwardly projecting region of the retaining element and the pressure measuring cell. The retaining element is configured with a cap with a base area portion and an outer area portion bent over with respect thereto and fitted over an end face of the process connector. The retaining element is in a material-bonded and/or form-fit manner connected to the process connector exclusively in the bent-over outer area portion so that the base area portion assumes a resilient property.

10 Claims, 3 Drawing Sheets

Figure 1:
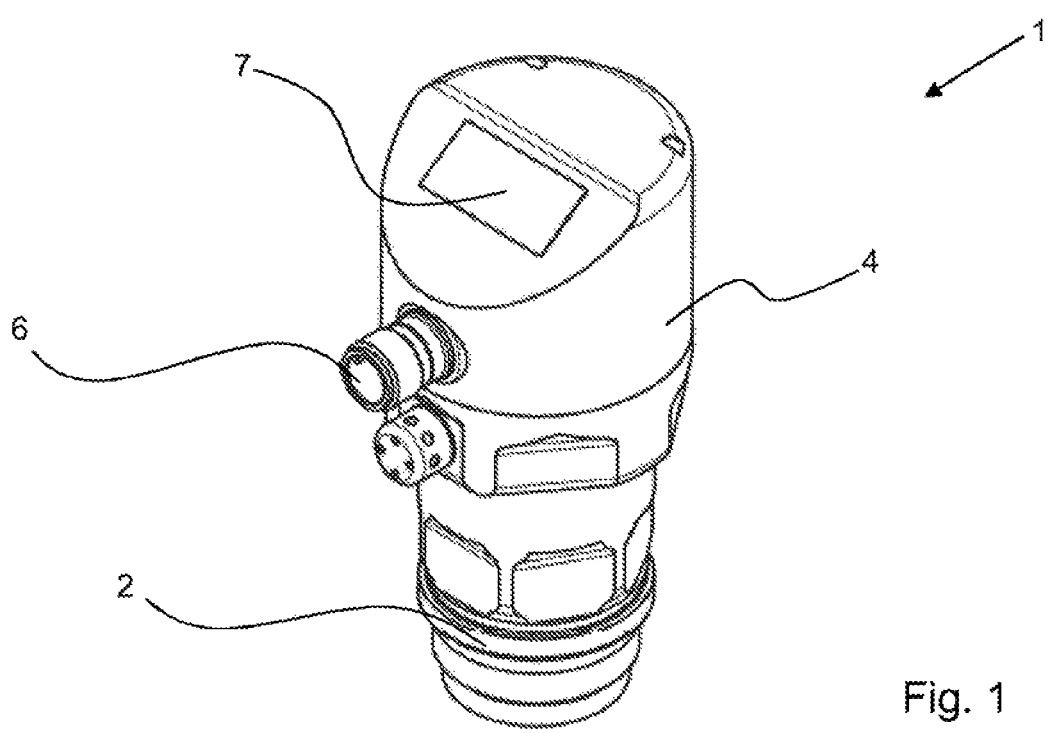

(52) U.S. Cl.
CPC ............ *G01L 19/14* (2013.01); *G01L 19/147* (2013.01); *G01L 19/142* (2013.01)

(58) Field of Classification Search
USPC .......................................................... 73/756
See application file for complete search history.

(56) References Cited

U.S. PATENT DOCUMENTS

| | | |
|---|---|---|
| 7,107,856 B2 | 9/2006 | Kopp |
| 9,103,701 B2 | 8/2015 | Knoll |
| 2005/0166682 A1* | 8/2005 | Tanaka .................. G01L 9/0058 73/753 |

FOREIGN PATENT DOCUMENTS

| | | | |
|---|---|---|---|
| DE | 10106129 A1 | 1/2003 | |
| DE | 19628551 B4 | 4/2004 | |
| DE | 10318678 A1 | 12/2004 | |
| DE | 102009028662 A1 * | 5/2010 | ............ G01D 11/30 |
| DE | 102011075698 A1 | 11/2011 | |
| DE | 102011005705 A1 | 9/2012 | |
| EP | 1471335 B1 | 11/2006 | |

* cited by examiner

PRESSURE MEASURING DEVICE

CROSS-REFERENCE TO RELATED APPLICATIONS

This application is a National Stage of International Application No. PCT/EP2017/055760, filed on Mar. 13, 2017, and published in German as WO2017/157,811 A1 on Sep. 21, 2017. This application claims the priority to German Patent Application No. 10 2016 204 511.3, filed on Mar. 18, 2016. The entire disclosures of the above applications are incorporated herein by reference.

FIELD

The disclosure relates to a pressure measuring device according to the preamble of claim 1.

BACKGROUND

This section provides background information related to the present disclosure which is not necessarily prior art.

Pressure measuring devices or pressure sensors are used in many industrial sectors for pressure measurement. They essentially consist of a process connector and a housing. The process connector serves to connect the measuring device with a container which contains the medium to be measured and to accommodate a pressure measuring cell as a transducer for the process pressure, such as a piezoresistive or capacitive measuring cell. The housing accommodates an evaluation electronics for signal processing and comprises a plug connector, via which the measuring device is supplied with power and via which the generated measuring signals can be tapped for further processing in a higher-level control unit, such as in a PLC.

Capacitive measuring cells consist of a compact unit with a ceramic base body and a membrane, wherein between the base body and the membrane a spacer ring is disposed which is for example configured as a glass solder ring. The resulting cavity between the body and the membrane allows the longitudinal movement of the membrane due to a pressure influence. At the bottom of the membrane and at the opposite upper side of the base body respective electrodes are provided, which together form a measuring capacitor. Exertion of pressure causes a deformation of the membrane, which results in a capacitance change of the measuring capacitor.

A major problem—especially due to the different requirements of the measuring cells, such as large pressure ranges, chemical resistance, etc.—is the effective sealing between the measuring cell and the process connector. In this respect, German patent DE 196 28 551 B4 proposes to mount an annular flat gasket of polytetrafluorethylene (PTFE) axially between the medium-side end face of the pressure measuring cell and an axial stop surface of the sensor housing in order to prevent a penetration of the pressure medium into the interior of the housing. In particular in applications in the food industry, strict constraints impose inter alia the requirement to ensure a dead space and to ensure that no substances get behind the gasket. A so-called cross contamination is to be avoided in any case. Consequently, a connection between the measuring cell and the process connector and thus also their sealing with respect to each other is required to meet these requirements.

Furthermore, there are requirements for applications in the food industry regarding the materials to be used. Thus, the use of conventional stainless steel (V4A) is often not sufficient and instead higher quality steels, certain materials such as titanium, or special alloys, such as Hastelloy, are required. However, these materials are usually very expensive, which can significantly affect the manufacturing cost of the pressure measuring devices in question.

In addition, said German patent DE 196 28 551 discloses that the pressure measuring cell rests on a resilient sealing bar, which experiences a bias during the assembly of the pressure measuring device, such that it acts as a dynamic force buffer, for example to counteract pressure or temperature related tolerances of the forces for fixing the pressure measuring cell. However, this sealing bar cannot protrude arbitrarily far inwardly, because the sealing element must not protrude beyond the inner diameter of the glass solder ring in order to avoid that the sealing element extends into the moving range of the membrane. For small diameter pressure cells, e.g. for measuring devices with ½-inch thread, therefore, only sealing bars with very little spring travel can be realized.

From EP 1 471 335 B1 a pressure measuring device is known in which the pressure measuring cell is axially fixed between an inwardly projecting part of the housing and a separate retaining element. However, the area of the measuring device in contact with the medium is difficult to clean, in particular because of the demonstrated sealing of the pressure measuring cell by means of an O-ring, so that it is sophisticated to meet the general hygienic requirements in the food industry—such as defined e.g. by the European Hygienic Engineering & Design Group (EHEDG). In addition, the separate retaining element has no spring action, so that the aforementioned pressure or temperature-related tolerances of the forces for fixing the pressure cell have to be compensated merely by the O-ring.

Furthermore, from DE 101 06 129 A1 a pressure measuring device with a separate retaining element is known, which fixes the pressure measuring cell axially together with a mounting ring as a counterpart. By screwing in the mounting ring, the retaining element experiences a bias. However, the retaining element is clamped between two housing parts, so that no front-flush construction is possible, as required by the food industry. Embodiments of front-flush pressure measuring devices are indeed also disclosed in DE 101 06 129 A1, however, they do not comprise a separate retaining element.

SUMMARY

This section provides a general summary of the disclosure, and is not a comprehensive disclosure of its full scope or all of its features.

It is the object of the disclosure to reduce the manufacturing costs of the abovementioned pressure measuring devices and to improve the spring action of the retaining element, in particular for small pressure measuring cells.

The object is achieved by a pressure measuring device with the features of claim 1. Advantageous embodiments of the disclosure are specified in the dependent claims.

According to the disclosure, the separate retaining element is configured in the form of a cap with a base area portion and an outer area portion bentover with respect thereto and is fitted over the end face of the process connector which faces the medium. Here, it is a critical factor that the retaining element is connected to the process connector in a material-bonded and/or form-fit manner in the bent-over outer area, so that the base area portion is freely movable in the axial direction and thus acquires a spring elastic property.

The advantage resulting therefrom is that the housing as well as the process connector can be manufactured from a stainless steel, such as V4A, common in the food industry and only the retaining element, i.e. only that part that comes into contact with the medium, has to consist of a higher quality and, thus, more expensive material. It is often assumed for certain applications, in particular in the food and pharmaceutical industries, that these parts consist of certain, high-quality materials which, for example, have better resistance to chemically aggressive media. By way of example, high-grade stainless steels, Hastelloy, titanium or special ceramics are to be mentioned as preferred materials. In this case, the aggressive medium is not only the actual measuring medium, because during a cleaning process (CIP—Cleaning in Place) the measuring device, i.e. the retaining element and the membrane of the pressure measuring cell, comes into contact with partly strongly acidic and/or hot cleaning liquids, which are flushed through the containers or pipelines.

Since now only the retaining element has to consist of one of these higher-quality materials, the material costs and thus the manufacturing costs of the measuring device can be significantly reduced as a whole. The manufacturing costs can be further reduced if according to an advantageous embodiment of the disclosure the retaining element is designed as a deep-drawn part.

A further advantage of the disclosure is that in contrast to retaining elements or sealing bars formed integrally with the process connector now an "extension" of the spring-elastic region is obtained. This is due to the fact that the retaining element is connected to the process connector exclusively in the bent-over outer area and thus the circumferential line, around which the base area portion with the bearing surface for the pressure measuring cell bends, is located further outwardly compared to the prior art, so that the movable, flexible part of the retaining element has become substantially larger. For pressure measuring cells with small diameter, such as for ½ inch measuring devices, now even spring elastic sealing bars can be realized. On the other hand, even with pressure measuring cells for very small pressures, for example in the range of 100 mbar, the movable range of the membrane can now also be extended in that the glass solder ring is displaced outwardly and formed narrower as a whole. For the same spring travel of the sealing bar thus the accuracy of measurement is improved.

As mentioned, the retaining element is connected to the process connector in a material-bonded and/or form-fit manner exclusively in the bent-over outer area. This means in particular a press fit or a welded connection. Also conceivable is a solder joint or that the process connector comprises a circumferential annular groove into which a deformation protrudes which is produced by reshaping the outer area portion. Also conceivable is a combination of the above-mentioned connection types.

The gasket can be placed on the sealing bar as a turned, milled or sintered part or as a film or can be connected to the sealing bar in a material-bonded manner as a coating or as a sheath and is configured as a thermoplastic material, preferably made of polytetrafluoroethylene (PTFE) or polyetheretherketone (PEEK). PTFE and PEEK each have a very good resistance to chemically aggressive media and are therefore outstandingly suitable for applications in the food and pharmaceutical industries. A coating or sheath of the sealing bar with PEEK or PTFE would then simultaneously represent a seal against the pressure measuring cell and a protection against the medium.

An advantageous embodiment provides that the retaining element comprises concentric grooves on the bearing surface for the seal. As a result, the radial movement of the PTFE seal caused by the cold flow can be controlled by use of a PTFE sealing element and the surface pressure can be increased. The depth of the elevations depends largely on the thickness of the gasket. For example, the grooves are between 0.03 mm and 0.2 mm high or deep when a PTFE gasket of 0.1 to 0.5 mm thickness is used.

A further advantageous embodiment provides that the outer area portion of the retaining element comprises at least one further bend. As a result of this further bend(s), the retaining element can be connected to the process connector in a material-bonded and/or form-fit manner in a second area, so that the strength of the connection between the retaining element and the process connector is increased. Another advantage is that by means of the further bend(s) a space for receiving a further sealing element is formed, which seals the connection of the measuring device to the adapter or flange of a container or a pipeline, which contains the medium to be measured.

It is particularly advantageous that the pressure measuring device meets hygienic requirements. In this case, in addition to the material selection and surface finish, in particular the features absence of dead space and gap are meant, so that it can be ensured that no substances are deposited.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Hereinafter, the disclosure will be explained in more detail based on exemplary embodiments with reference to the drawings.

Figure 2:
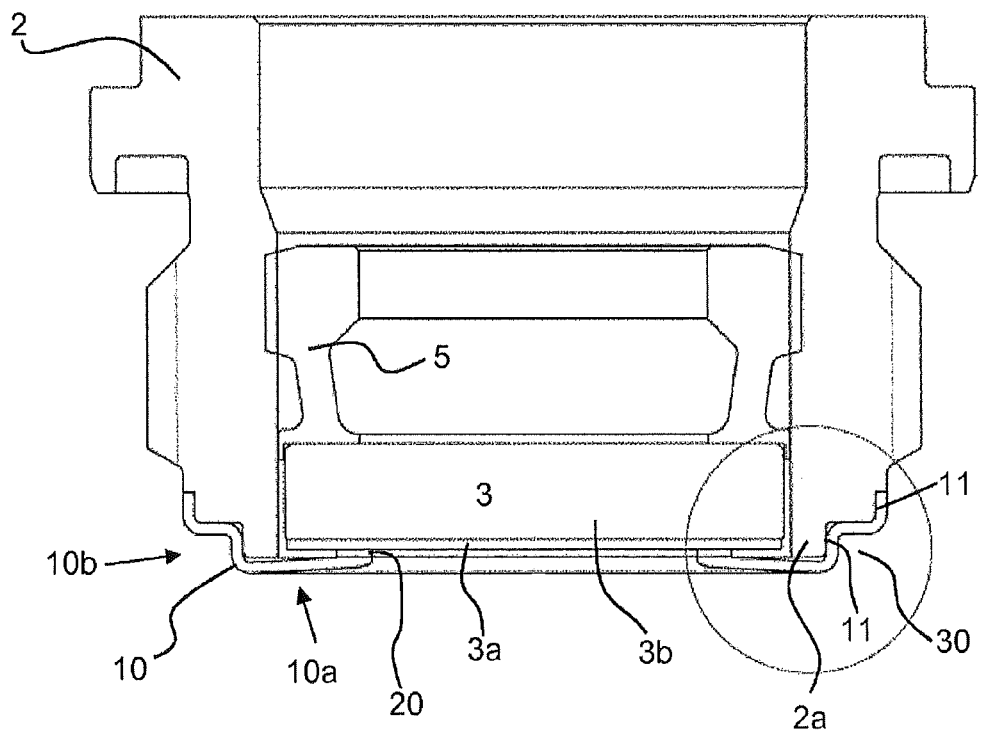
Figure 3:
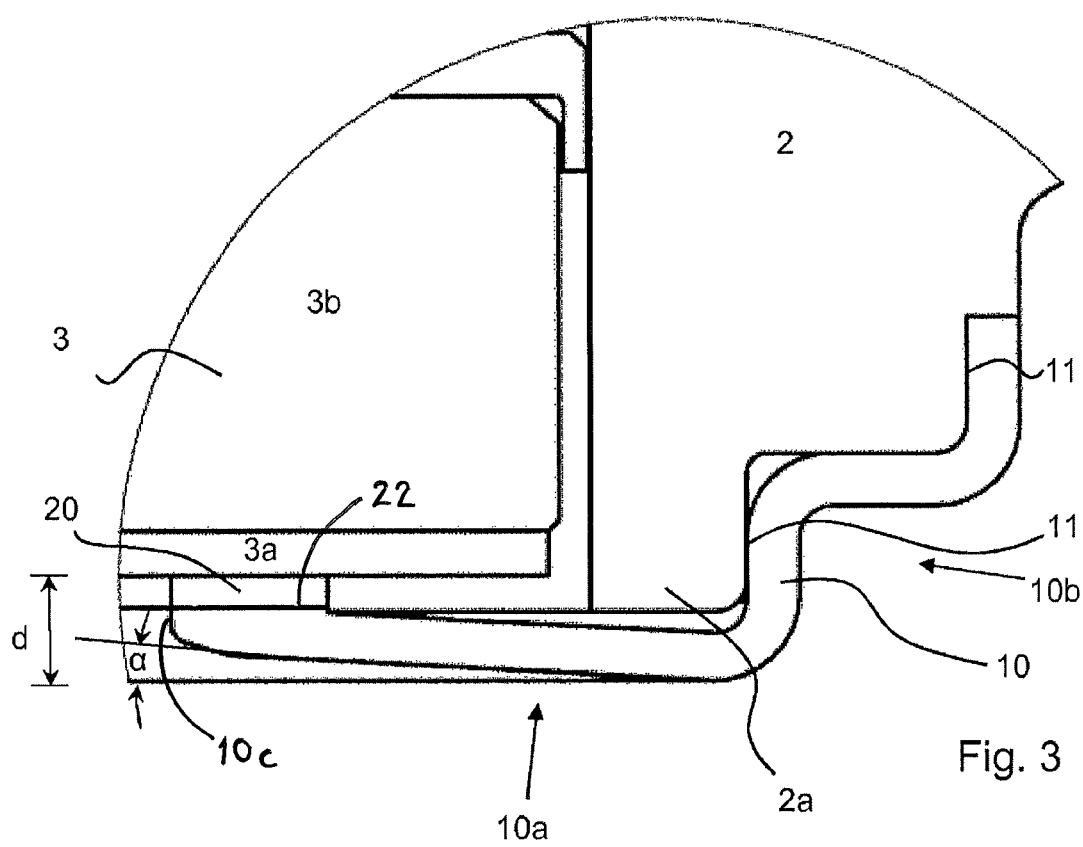
Figure 4:
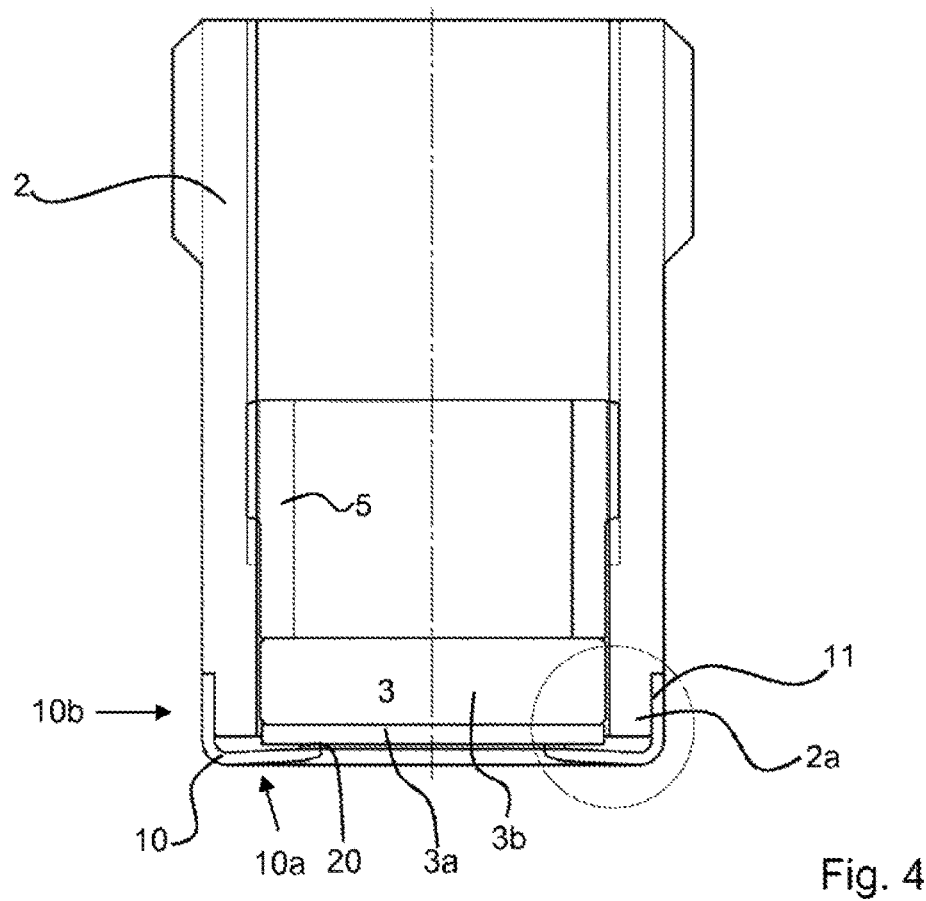
Figure 5:
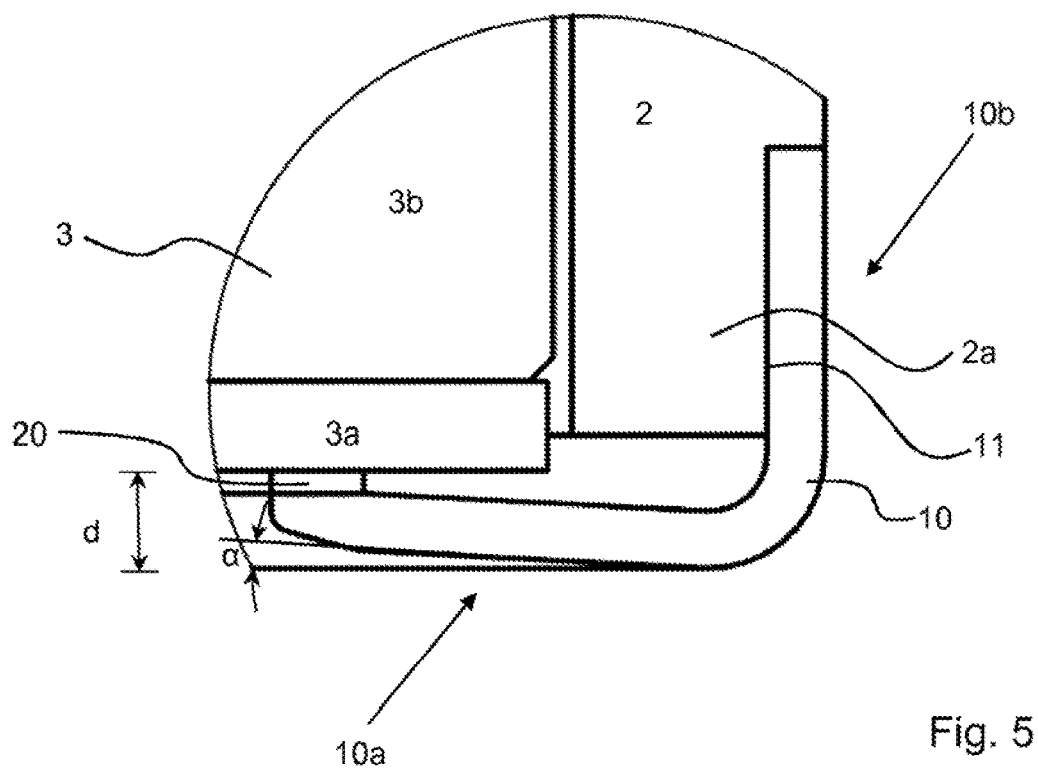

The drawings schematically show:

FIG. 1 a pressure measuring device according to the disclosure;

FIG. 2 a longitudinal sectional view through the process connector of a first embodiment of a pressure measuring device according to the disclosure;

FIG. 3 an enlarged detail of FIG. 2;

FIG. 4 a longitudinal sectional view through the process connector of a second embodiment of a pressure measuring device according to the disclosure; and FIG. 5 an enlarged detail of FIG. 4.

In the following description of the preferred embodiments, like reference characters designate like or similar components.

DETAILED DESCRIPTION

Example embodiments will now be described more fully with reference to the accompanying drawings.

FIG. 1 shows a first embodiment of a pressure measuring device 1 according to the disclosure. The pressure measuring device 1 is connected via a process connector 2 to a container containing the medium to be measured, i.e. a pipeline, a tank or the like. In most cases, this connection is established by means of a flange formed at the container or a corresponding adapter. On the housing 4 a display and operating unit 7 is disposed, via which the measurement results are displayed and various settings can be made by the operating personnel, such as setting a switching point or indicating the measuring values in various units of measurement. However, the disclosure also encompasses so-called transmitter devices which have no display or operating unit and merely output an analog voltage or current signal which corresponds to the measurement result and is evaluated in a higher-level control unit. On the side of the housing 4 a plug connector 6 is disposed, via which the pressure measuring device 1 is supplied with energy and which acts as an electronic interface to provide the generated measurement signals for further processing to said control unit, e.g. a PLC.

FIG. 2 shows a longitudinal sectional view through the process connector 2 of a pressure measuring device 1 according to the disclosure. The process connector 2 is typically made of stainless steel, which is often used in the food, chemical and pharmaceutical industries in particular due to its good resistance. A retaining element 10 is fitted over the end face 2a of the process connector 2, wherein the retaining element is configured, for example, as a deep-drawn part from a sheet metal. A capacitive pressure measuring cell 3 consisting of a ceramic base body 3b and a ceramic membrane 3a is clamped between this retaining element 10 and a support element 5, wherein between the retaining element 10 and the pressure measuring cell 3, moreover, a sealing element 20 is arranged, which in the present case is configured as a sealing film 20 from PTFE. In the present case, the support element 5 is configured as a metallic threaded ring and connected to the process connector 2 by means of a threaded connection indicated in FIG. 2.

The retaining element 10 is subdivided into a base area portion 10a and an outer area portion 10b bent-over with respect thereto. A central aperture 10c extends through base area portion 10a. The base area portion 10a serves essentially to keep the pressure measuring cell 3 elastic, while the outer area portion 10b is intended to establish the connection of the retaining element 10 to the process connector. This is preferably done either by means of a press fit or a welded joint or a combination of both. Also conceivable are solder joints or intermeshing reshapings.

It can be clearly seen that the entire base area portion 10a of the retaining member 10 is freely movable and thus assumes the function of a spring bar as known from the aforementioned German patent DE 196 28 551 B4. Upon screwing the threaded ring 5 this spring bar 10a experiences a bias and thus fulfills the function of a dynamic force buffer which is able to react quickly and effectively to pressure and/or temperature-related tolerances of the forces for clamping the pressure measuring cell 3. Thus, a secure fixation and sealing of the pressure measuring cell 3 is ensured in any case.

Now only the membrane 3a of the measuring cell 3 and the base area portion 10a of the retaining element 10 come into contact with the medium and an optionally aggressive cleaning liquid. The membrane 3a, as mentioned above, is made from a ceramic material and is thus extremely resistant to chemically aggressive media. The retaining element 10 is for this reason made of a ceramic material or of a higher-grade stainless steel, Hastelloy or titanium, wherein the retaining element 10 does not necessarily have to be made entirely of these materials, but, for example, can be configured as a conventional sheet metal part, which is sheathed, covered, coated or the like with one of these materials or with PEEK or PTFE. Thus, the end face 2a of the process connector 2 facing the medium is protected in a simple manner against chemically aggressive media.

The retaining element 10 is bent-over three times in the present embodiment. The material-bond and/or form-fit connection between the retaining element 10, i.e. the outer area portion 10b, and the process connector 2 is then established at least one of the two lengthwise contact surfaces 11 of both parts, preferably both. By means of the further bends a space in the form of a circumferential groove 30 for receiving a further sealing element is formed, which seals the connection of the measuring device 1 or the process connector 2 to a container or a pipeline which contains the medium to be measured. This further sealing element is typically made of an elastomer, in particular configured as an O-ring, or of a thermoplastic or thermosetting plastic, for example of polyetheretherketone (PEEK).

FIG. 3 shows an enlarged view of the encircled portion in FIG. 2. It should be noted that the pressure measuring cell is not cut here similar as in FIG. 2, so that the aforementioned glass solder ring which acts as a spacer between the base body 3b and the membrane 3a is not shown in the present case.

In order to achieve a hygienic sealing of the ceramic pressure measuring cell with respect to the medium to be measured, the distance d between the pressure measuring cell and the end face of the measuring device 1 must be as small as possible. Then the measuring device 1 can be called front-flush. In the present case, this is achieved on the one hand by a thin spring bar 10a with a maximum thickness of 0.4 to 0.5 mm and a gasket 20 with a thickness—depending on its configuration as a coating, foil or turned part—from 0.01 to 0.5 mm. As a result, the distance d is then in the range 0.5 to 1 mm, preferably 0.7 to 0.8 mm.

It has already been mentioned that the spring bar 10a, i.e. the base area portion 10a of the retaining member 10, is freely movable. This can be clearly seen in FIG. 3. The spring effect is reinforced by the fact that it is directed inwardly at an angle $\alpha$. When installing the pressure measuring cell 3, i.e. by screwing the threaded ring 5, the spring bar 10a is pressed down in the elastic region. As a result, the spring bar 10a acts as a force buffer which reacts dynamically to temperature changes or creep behavior of the PTFE gasket 20 and thus permanently ensures the sealing function.

Spring bar 10a further comprises concentric grooves 22 on the contact surface for the gasket 20, which are applied, for example, by embossing. By this embossing the creep of the PTFE gasket 20 is limited in that the gasket 20 is additionally chambered. Depending on the thickness of the gasket 20 the grooves have a depth between 0.03 mm and 0.2 mm.

By means of the angle $\alpha$, at which the spring bar 10a is directed inwardly, it is further achieved that in the outer area of the contact surface facing the medium between the spring bar 10a and measuring cell 3 the surface pressure is highest, so that a permanent absence of any gap and dead space is ensured and thus an optimum hygiene is achieved.

FIG. 4 shows a second embodiment of a pressure measuring device 1 according to the disclosure. The difference is that here the retaining element 10 is bent-over only once. This embodiment is particularly suitable for measuring devices 1 with a small design. In the present case, therefore, a process connector 2 of a measuring device with a ½ inch thread is shown. However, this embodiment is also conceivable for any other measuring device size, if, for example, the groove 30 resulting from the multiple bending (see FIGS. 2 and 3) for receiving a sealing element for the connection to an adapter or flange is not required and the sealing is realized here by means of a metal-metal seal or this sealing element is arranged externally in the adapter or flange.

The diameter of the measuring cell 3 is approximately 14 mm in the case of a measuring device with a ½-inch thread. Consequently, so far, the actual spring travel for sealing bars formed at the process connector was very small. With the disclosure, the spring travel of the sealing bar 10a is extended and thus its spring action is significantly increased while avoiding that the sealing bar 10a protrudes into the movable part of the membrane 3a.

The material-bonded and/or form-fit connection between the retaining element 10, i.e. the outer area portion 10b, and the process connector 2 is established in the present case only at the one lengthwise contact surface 11 of both parts. Apart from that, the embodiment corresponds to that shown in FIGS. 2 and 3, so that reference is made thereto in order to avoid repeated descriptions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A pressure measuring device for detecting the pressure of a medium within a container or a pipeline, comprising
    a capacitive pressure measuring cell consisting of a base body and a membrane;
    a process connector accommodating the pressure measuring cell; and
    a housing mounted on the process connector for accommodating means for electronic signal processing,
    wherein a retaining element is arranged at the process connector, wherein the pressure measuring cell rests with the membrane side thereof on an inwardly projecting base area portion of the retaining element, so that only the membrane and the base area portion of the retaining element are in contact with the medium, the retaining element coupling the pressure measuring cell to the process connector,
    wherein a sealing element is arranged between the inwardly projecting base area portion of the retaining element and the pressure measuring cell in order to prevent a penetration of the measuring medium into the interior of the housing, and
    wherein the retaining element and the process connector are formed as separate parts,
    wherein the retaining element is shaped as a ring including the base area portion circumscribed by an outer area portion bent-over with respect thereto and fitted over the end face of the process connector facing the medium, wherein the retaining element is in a material-bonded and/or form-fit manner connected to the process connector exclusively in the bent-over outer area portion so that the base area portion is elastically preloaded with respect to the pressure measuring cell.

2. The pressure measuring device according to claim 1, wherein the retaining element comprises concentrically extending grooves at the contact surface for the sealing element.

3. The pressure measuring device according to claim 1, wherein the sealing element is configured as a turned, milled or sintered part, as a film or as a coating.

4. The pressure measuring device according to claim 1, wherein the retaining element is configured as a deep-drawn part from a sheet metal.

5. The pressure measuring device according to claim 1, wherein the outer area portion of the retaining element comprises at least one further bend.

6. The pressure measuring device according to claim 1, wherein the retaining element has a maximum thickness of 0.4 to 0.5 mm in the base area portion.

7. The pressure measuring device according to claim 1, wherein the distance d between the side of the pressure measuring cell membrane facing the medium and the bottom side of the retaining element facing the medium is 0.5 to 1 mm, preferably 0.7 mm.

8. The pressure measuring device according to claim 1, wherein the sealing element has a thickness of 0.01 to 0.5 mm.

9. The pressure measuring device according to claim 1, wherein the pressure measuring device meets hygienic requirements.

10. The pressure measuring device according to claim 1, wherein an inward extent of the base area portion of the retaining element is limited by a central aperture in the retaining element, which allows the membrane to be in contact with the medium.

* * * * *